US010533661B2

(12) United States Patent
Choi et al.

(10) Patent No.: US 10,533,661 B2
(45) Date of Patent: Jan. 14, 2020

(54) METHOD FOR CONTROLLING VEHICLE EQUIPPED WITH AUTOMATIC TRANSMISSION

(71) Applicant: Hyundai Motor Company, Seoul (KR)

(72) Inventors: Jae Young Choi, Seoul (KR); Hye Kil Hwang, Suwon-Si (KR); Sang Don Lee, Suwon-Si (KR); Woo Suk Choi, Gyeonggi-Do (KR); Joon Shik Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 818 days.

(21) Appl. No.: 15/241,877

(22) Filed: Aug. 19, 2016

(65) Prior Publication Data

US 2017/0276241 A1  Sep. 28, 2017

(30) Foreign Application Priority Data

Mar. 23, 2016  (KR) .......................... 10-2016-0034491

(51) Int. Cl.
*F16H 61/14* (2006.01)
*F16H 63/50* (2006.01)
*F16H 59/14* (2006.01)

(52) U.S. Cl.
CPC ............. *F16H 63/50* (2013.01); *F16H 59/14* (2013.01)

(58) Field of Classification Search
CPC .................................. F16H 63/50; F16H 59/14
USPC ........................................................... 701/54
See application file for complete search history.

(56) References Cited

U.S. PATENT DOCUMENTS

| 6,317,671 | B1 * | 11/2001 | Tsutsui ................... F16H 61/20 477/109 |
| 2007/0046096 | A1 * | 3/2007 | Marriott .................. B60B 7/04 301/37.25 |
| 2010/0236231 | A1 * | 9/2010 | Miyabe ............... F16H 61/0031 60/413 |
| 2012/0196722 | A1 * | 8/2012 | Preisner ................ B60W 10/02 477/166 |
| 2015/0219214 | A1 * | 8/2015 | Kawamoto ............. F02D 17/00 701/51 |

* cited by examiner

*Primary Examiner* — Jacob S. Scott
*Assistant Examiner* — Michael E Butler
(74) *Attorney, Agent, or Firm* — Mintz Levin Cohn Ferris Glovsky and Popeo, P.C.; Peter F. Corless

(57) ABSTRACT

A method for controlling a vehicle installed with an automatic transmission, includes: a sudden stop determination step in which a controller determines whether the vehicle has stopped at a speed greater than or equal to a reference deceleration speed and whether a post-stop elapsed time is within a first reference time; a takeoff determination step in which the controller determines whether an input torque of the transmission exceeds zero within the first reference time when a shift range is in a driving range; a pressure control step in which, when the vehicle takes off, the controller elevates a line pressure of the transmission; a limitation determination step in which if a slippage extent of a turbine exceeds a reference slippage value for a second reference time, the controller limits the takeoff; and a torque reduction step in which the controller reduces a takeoff torque input of the transmission.

8 Claims, 4 Drawing Sheets

METHOD FOR CONTROLLING VEHICLE EQUIPPED WITH AUTOMATIC TRANSMISSION

CROSS REFERENCE TO RELATED APPLICATION

The present application claims under 35 U.S.C. § 119(a) the benefit of Korean Patent Application No. 10-2016-0034491, filed Mar. 23, 2016, the entire contents of which are incorporated by reference herein.

BACKGROUND (a) Field of the Invention

The present invention relates to a method for controlling a vehicle installed with an automatic transmission controlled by oil pressure, more particularly, to a method for controlling a vehicle upon sudden takeoff after a sudden stop.

(b) Description of the Related Art

Generally, an automatic transmission is designed to automatically perform a gear change operation to a target gear by controlling a multitude of clutches using oil pressure.

When a vehicle equipped with an automatic transmission stops suddenly, the transmission oil may flow to one side, temporarily emptying the oil pan. Upon acceleration under this condition, the proper oil pressure may not be supplied to the clutches, resulting in incomplete engagement of the transmission clutches, with the consequence of dissipation of turbine velocity.

Further, the normalization of oil pressure in the transmission clutches just after the dissipation of turbine velocity may induce excessive slippage, causing the transmission clutches to decrease in durability or to be damaged by fire.

The description provided above as a related art of the present invention is just for helping understanding the background of the present invention and should not be construed as being included in the related art known by those skilled in the art.

SUMMARY

Accordingly, the present invention provides a method for controlling a vehicle equipped with an automatic transmission by which a dissipation of turbine velocity can be avoided upon acceleration after a sudden stop, thus preventing a decrease in durability of transmission clutches or damage by tire.

In order achieve the above object, according to one aspect of the present invention, there is provided a method for controlling a vehicle installed with an automatic transmission, comprising: a sudden stop determination step in which a controller determines whether the vehicle has stopped at a deceleration speed greater than or equal to a predetermined reference deceleration speed and whether post-stop elapsed time is within a predetermined first reference time; a takeoff determination step in which the controller determines whether an input torque of the transmission is higher than zero (0) within the first reference time under the condition that a shift range of the vehicle is in a driving range; a pressure control step in which, when the vehicle is determined to take off in the takeoff determination step, the controller elevates the line pressure of the transmission to a degree greater than a previous value; a limitation determination step in which if a slippage extent of a turbine has been maintained the same as or greater than a reference slippage value for a second reference time when the vehicle is determined to take off in the takeoff determination step, the controller determines a need to limit the takeoff of the vehicle; and a torque reduction step in which the controller reduces a takeoff torque input to the transmission when the takeoff of the vehicle is determined to be limited.

In one embodiment of the present invention, the driving range in the takeoff determination step is a shift range that can supply a driving force to driving wheels W and within which a D range and an R range fall; and whether an input torque of the transmission T is higher than zero (0) is determined using APS signals.

In another embodiment of the present invention, the line pressure of the transmission T is increased as high as possible in the pressure control step.

In another embodiment of the present invention, the turbine slippage extent of the limitation determination step is set forth as the difference between an actual turbine velocity and a turbine velocity calculated based on the vehicle speed.

According to another embodiment of the present invention, in the limitation determination step, the reference slippage value is set forth based on a noise volume that the driver starts to recognize upon the dissipation of the turbine velocity, and the second reference time is set forth based on the time at which the driver starts to recognize that the vehicle cannot take off.

In another embodiment of the present invention, the controller in the torque reduction step requests a control unit to reduce a takeoff torque, said control unit functioning to control a power source that supplies power to the transmission T.

In another embodiment of the present invention, when the turbine slippage value is below a target slippage value during the torque reduction step, the controller stops the torque reduction step and gradually restores the input torque of the transmission T to a normal state.

In another embodiment of the present invention, during progression from the sudden stop determination step to the torque reduction step, the torque reduction step is stopped when the shift range is converted into a non-driving range or when the input torque of the transmission T is removed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program to instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
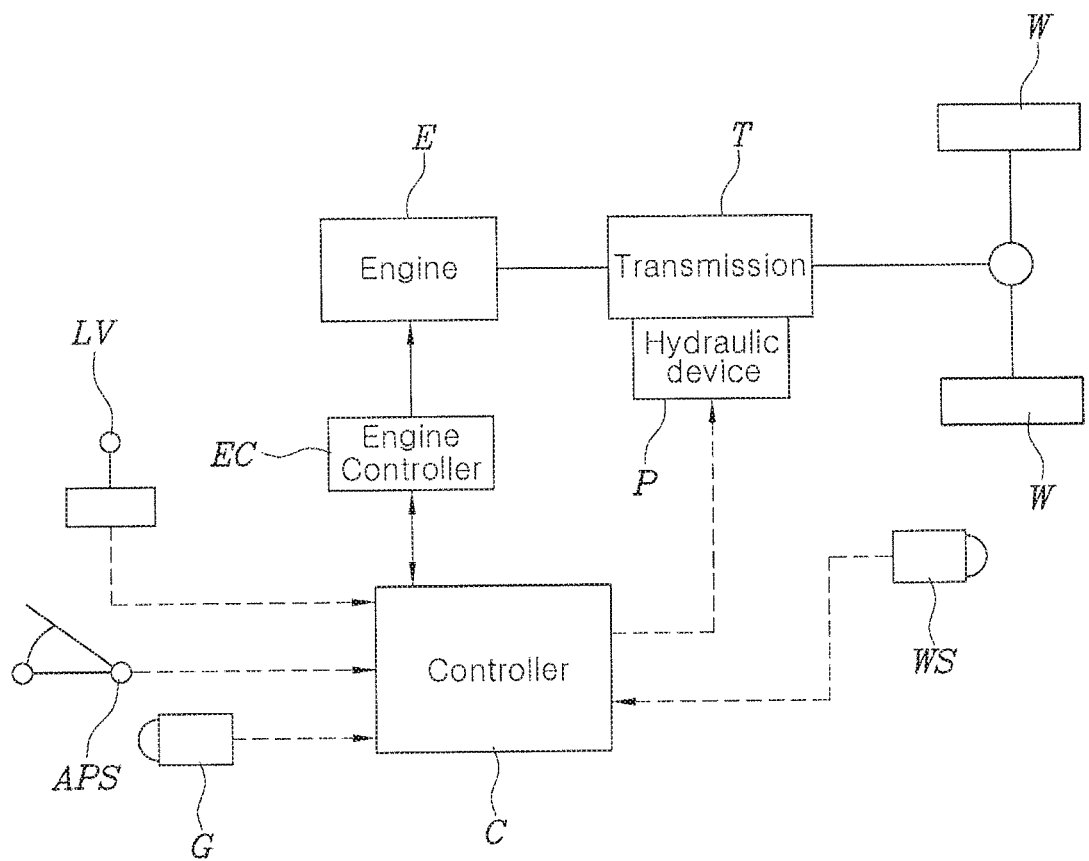
FIG. 1 is a schematic diagram of the structure of a vehicle to which the present invention is applicable.

With reference to FIG. 1, the present invention can be applied to a vehicle configuration as shown. In particular, the driving three of an engine E is input into a transmission T and transmitted to driving wheels W. Also, a controller C is input with a selected shift range, determined by the operation of a shift lever LV, with the depressed extent of an accelerator pedal through an accelerator position sensor (APS), and with a degree of acceleration or deceleration of the vehicle from an acceleration sensor G. Further, the controller C can recognize the speed of the vehicle based on the wheel speed input from a wheel speed sensor WS, and can control the line pressure of a hydraulic device P of the transmission T. Further, the controller is configured to be capable of indirect control of engine torque by making a request to an engine controller EC.

A power source for the vehicle may include an electric motor as well as the engine E. As used herein, the transmission T refers to an automatic transmission that is provided with a torque converter having a turbine therein and which automatically performs gear shifting using multiple clutches actuated by oil pressure.

Of course, the information of the depressed extent of the accelerator pedal, the degree of acceleration or deceleration, and the wheel or vehicle velocity may be input from corresponding sensors or devices into the controller C either directly or through a communication network such as Controller Area Network (CAN). In this communication mode, the controller C may also make a request for cooperation with the engine.

The controller C may be integrated with or separated from the engine controller EC, as shown in FIG. 1.

Figure 2:
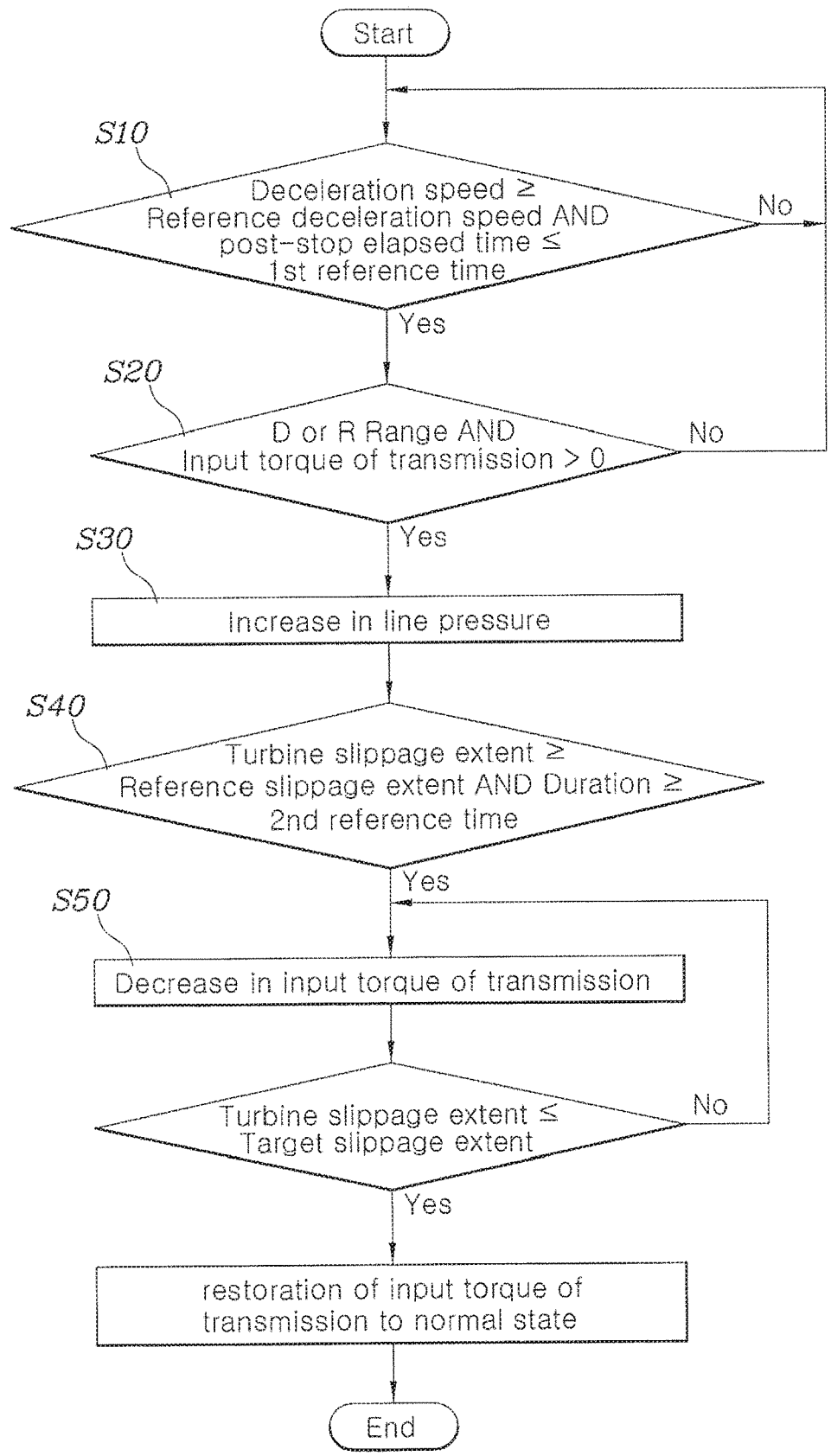
FIG. 2 is a flowchart of a method for controlling a vehicle installed with an automatic transmission T in accordance with an embodiment of the present invention.

FIG. 2 is a flowchart of a method for controlling a vehicle installed with an automatic transmission T in accordance with an embodiment of the present invention. The method comprises a sudden stop determination step (S10), in which a controller C determines whether the vehicle has stopped at a deceleration speed greater than or equal to a predetermined reference deceleration speed and whether a post-stop elapsed time is within a predetermined first reference time; a takeoff determination step (S20), in which the controller C determines whether an input torque of the transmission T is higher than zero (0) within the first reference time under the condition that a currently selected shift range of the vehicle is in a driving range; a pressure control step (S30) in which when the vehicle is determined to take off in the takeoff determination step (S20), the controller C elevates a line pressure of the transmission T to a degree greater than a previous value; a limitation determination step in which, if a slippage extent of the turbine has been maintained at the same as or greater than a reference slippage value for a second reference time when the vehicle is determined to take off in the takeoff determination step (S20), the controller C determines a need to limit the takeoff of the vehicle; and a torque reduction step (S50) in which the controller C reduces a takeoff torque input to the transmission T when the takeoff vehicle is determined to be limited.

In particular, under the condition that the input torque of the transmission T exceeds zero (0) in the takeoff determination step (S20) within the first reference time as determined in the sudden stop determination step (S10), the controller C increases the line pressure in the pressure control step (S30), thus preventing the clutches installed in the transmission T from being insufficient in oil pressure. Concurrently, the controller C performs the limitation determination step (S40) to determine whether or not the torque reduction step (S50) is allowed to start. In the torque reduction step (S50), the torque input into the transmission T is reduced to prevent the turbine from unnecessarily and greatly increasing in velocity and to prevent the clutches from being damaged by fire or degraded in durability.

Since the controller C employs an acceleration sensor G in the sudden stop determination step (S10) to determine whether the vehicle has stopped at a deceleration speed greater than a predetermined reference deceleration speed, the reference deceleration speed is set to a deceleration speed level at which the vehicle suddenly stops, thereby causing the oil in the transmission T to gather at one side to such a degree as to hinder the supply of suitable oil pressure for the transmission T, as designed through a multitude of experiments and repeated analysis.

Even when the vehicle has stopped at a deceleration speed greater than the reference deceleration speed, if a sufficient post-stop elapsed time is given, the oil in the transmission t is restored to a normal state, under which suitable oil pressure is provided for the transmission T without problems. Accordingly, in consideration of the above-described situation, the first reference time is set to a time within which it is highly unlikely that sufficient oil pressure will be provided to the transmission T in the event of an attempt to start motion of the vehicle. The first reference time may differ from one vehicle to another, and thus is determined through design based on data obtained from a multitude of experiments and repeated analysis.

As used herein, the term "driving range" in the takeoff determination step (S20) refers to a shift range, including a drive (D) range and a reverse (R) range that can supply a driving force to driving wheels W. Whether the input torque of the transmission T is higher than zero (0) can be determined using APS signals.

Here, the term "driving range" is intended to mean all shift ranges that allow for the application of driving force to driving wheels of a vehicle, whether it is called a D range, an R range, or some other name. As will be described later, the term "non-driving range" means a shift range that does not allow for the application of driving force to driving wheels, such as a park (P) range or a neutral (N) range.

The controller C may determine, on the basis of the information provided from the engine controller EC, whether an input torque of the transmission T exceeds zero (0).

Figure 4:
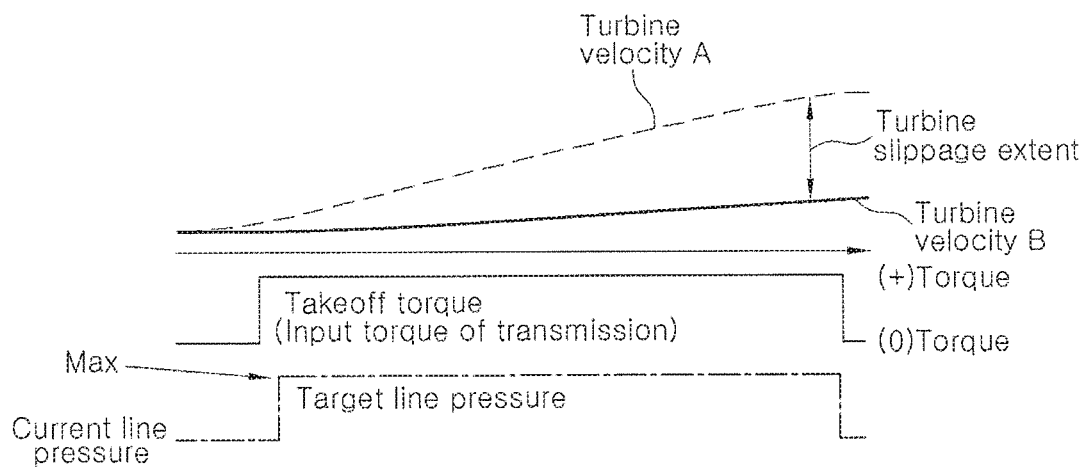
FIG. 4 is a graph illustrating a pressure control step of the present invention.

In the pressure control step (S30), as shown in FIG. 4, the line pressure of the transmission T can be increased to the maximum.

In other words, so long as no particular limitations are needed, the controller C is allowed to set the maximum line pressure of the transmission T under the above-mentioned situation, which is easily sufficient to set a normal oil pressure for the transmission T.

In the limitation determination step (S40), the turbine slippage extent is the difference between the actual turbine velocity and a turbine velocity calculated based on a vehicle speed.

That is, the controller C regards turbine slippage as the difference between an actual turbine velocity and a turbine velocity calculated by applying a current gear ratio of the transmission gear, set to the vehicle speed, determined by signals of the wheel speed sensor WS.

Figure 3:
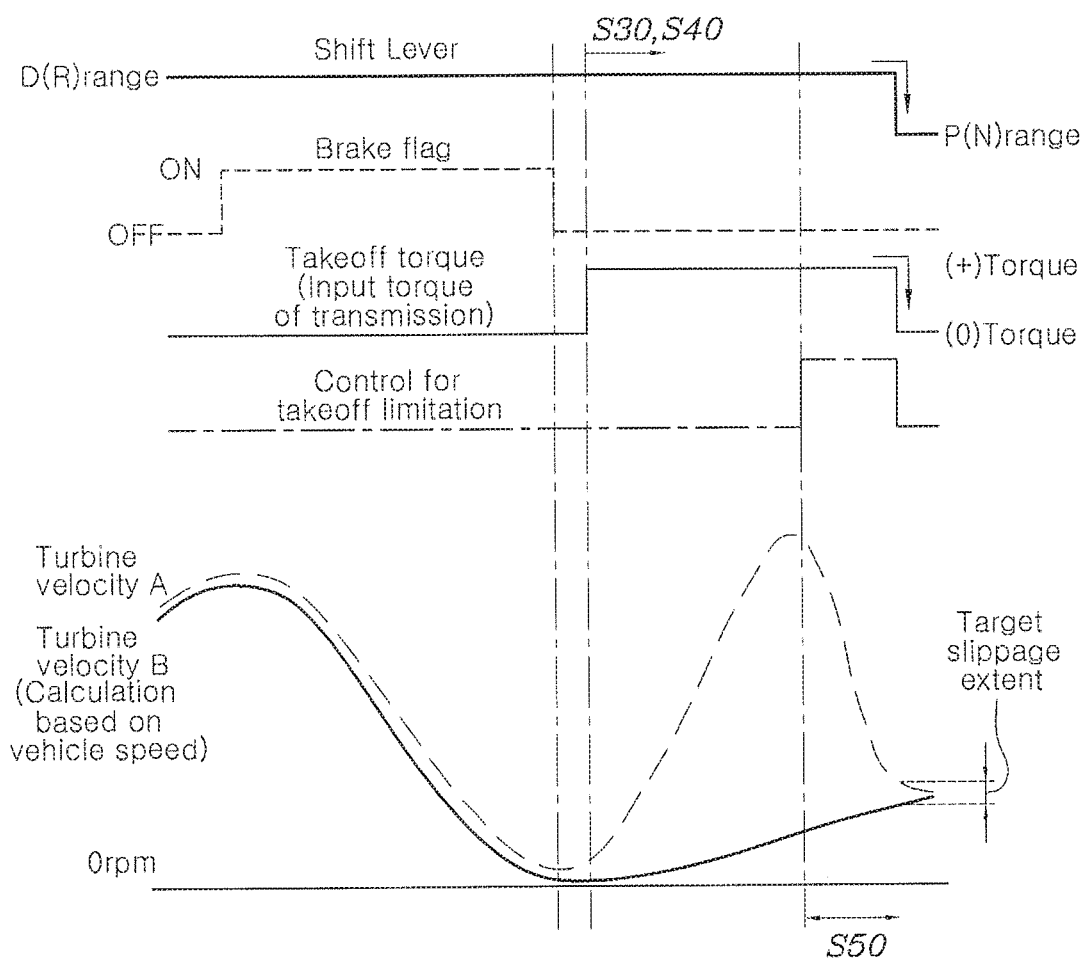
FIG. 3 is a graph illustrating an overall procedure of the present invention.
Figure 5:
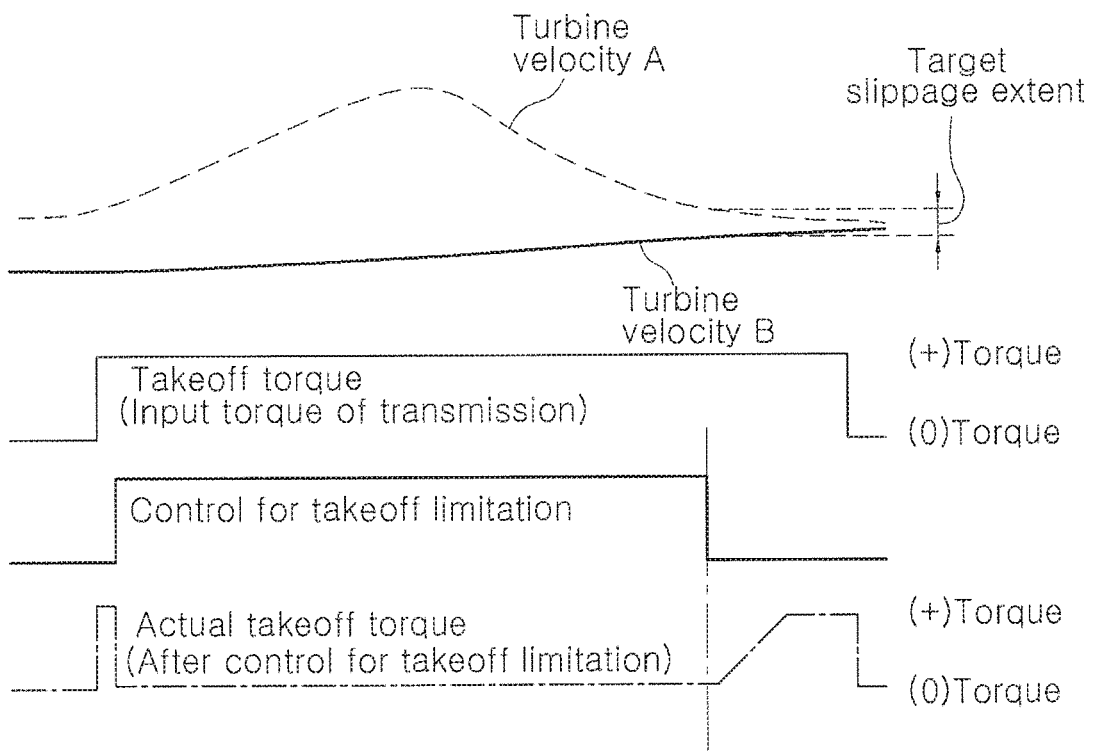
FIG. 5 is a graph illustrating a torque reduction step of the present invention.

For reference, turbine velocities A and B in FIGS. 3 to 5 refer respectively to an actual turbine velocity and a turbine velocity calculated on the basis of a vehicle speed.

In the limitation determination step (S40), the reference slippage value is set forth based on the noise volume that the driver starts to recognize upon the dissipation of the turbine velocity, and the second reference time is set forth based on the time at which the driver starts to recognize that the vehicle cannot take off.

The reference slippage value and the second reference time may be not determined based on perception by the driver as noted above. Rather, they may be suitably determined through design in consideration of the durability of transmission clutches.

In the torque reduction step (S50), the controller C may request a control unit to reduce a takeoff torque, said control unit functioning to control a power source that supplies power to the transmission T.

According to some embodiments of the present invention, the controller C may request the engine controller EC to reduce torque, so that even though the driver operates an accelerator pedal, as shown in FIG. 5, the takeoff torque is reduced below the normal state corresponding to the operation of the accelerator pedal. Hence, the excessive increase of turbine velocity can be restrained.

When the turbine slippage value is below a target slippage value during the torque is reduction step (S50), the controller C stops the torque reduction step S50 and gradually restores the input torque of the transmission T to a normal state, thereby preventing the generation of an impact attributed to a sudden increase in torque.

Here, the target slippage value is set to be a value at which the engagement of the transmission clutches associated with the transmission gear set can be determined to be almost completed. Accordingly, the torque reduction step is terminated under the condition that a further reduction of the input torque of the transmission is ascertained to be useless.

Moreover, in the course of progression from the sudden stop determination step (S10) to the torque reduction step (S50), the torque reduction step (S50) is stopped when the shift range is converted into a non-driving range, such as a P range or an N range, or when the input torque of the transmission T is removed.

As described above, the method according to the present invention can avoid the dissipation of turbine velocity upon acceleration after a sudden stop, thus preventing the transmission clutches from decreasing in durability and from being damaged by fire.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A method for controlling a vehicle installed with an automatic transmission, comprising:
   a sudden stop determination step in which a controller determines whether the vehicle has stopped at a deceleration speed greater than or equal to a predetermined reference deceleration speed and whether a post-stop elapsed time is within a predetermined first reference time;
   a takeoff determination step in which the controller determines whether an input torque of the transmission is higher than zero (0) within the first reference time under a circumstance that a shift range of the vehicle is in a driving range;
   a pressure control step in which when the vehicle is determined to take off in the takeoff determination step, the controller elevates a line pressure of the transmission to a degree greater than a previous value;
   a limitation determination step in which if a slippage extent of a turbine has been maintained at the same as or greater than a reference slippage value for a second reference time when the vehicle is determined to take off in the takeoff determination step, the controller determines a need to limit a takeoff of the vehicle; and
   a torque reduction step in which the controller reduces a takeoff torque input to the transmission when, the takeoff of the vehicle is determined to be limited.

2. The method of claim 1, wherein the driving range in the takeoff determination step is a shift range which can supply a driving force to driving wheels W and within which a D range and air R range fall; and whether an input torque of the transmission T is higher than zero (0) is determined using APS signals.

3. The method of claim 1, wherein the line pressure of the transmission T is increased to as high a degree as possible in the pressure control step.

4. The method of claim 1, wherein the turbine slippage extent of the limitation determination step is set forth as a difference between an actual turbine velocity and a turbine velocity calculated from a vehicle speed.

5. The method of claim 1, wherein, in the limitation determination step, the reference slippage value is set forth based on a noise volume that the driver starts to recognize upon the dissipation of the turbine velocity, and the second reference time is set forth based on a time at which the driver starts to recognize that the vehicle cannot take off.

6. The method of claim 1, wherein the controller in the torque reduction step requests a control unit to reduce a takeoff torque, said control unit functioning to control a power source that supplies power to the transmission T.

7. The method of claim 1, wherein when the turbine slippage value is below a target slippage value during the torque reduction step, the controller stops the torque reduction step and gradually restores the input torque of the transmission T into a normal state.

8. The method of claim 1, wherein, during progression from the sudden stop determination step to the torque reduction step, the torque reduction step is stopped when the shift range is converted into a non-driving range or when the input torque of the transmission T is removed.

* * * * *